United States Patent Office 3,734,996
Patented May 22, 1973

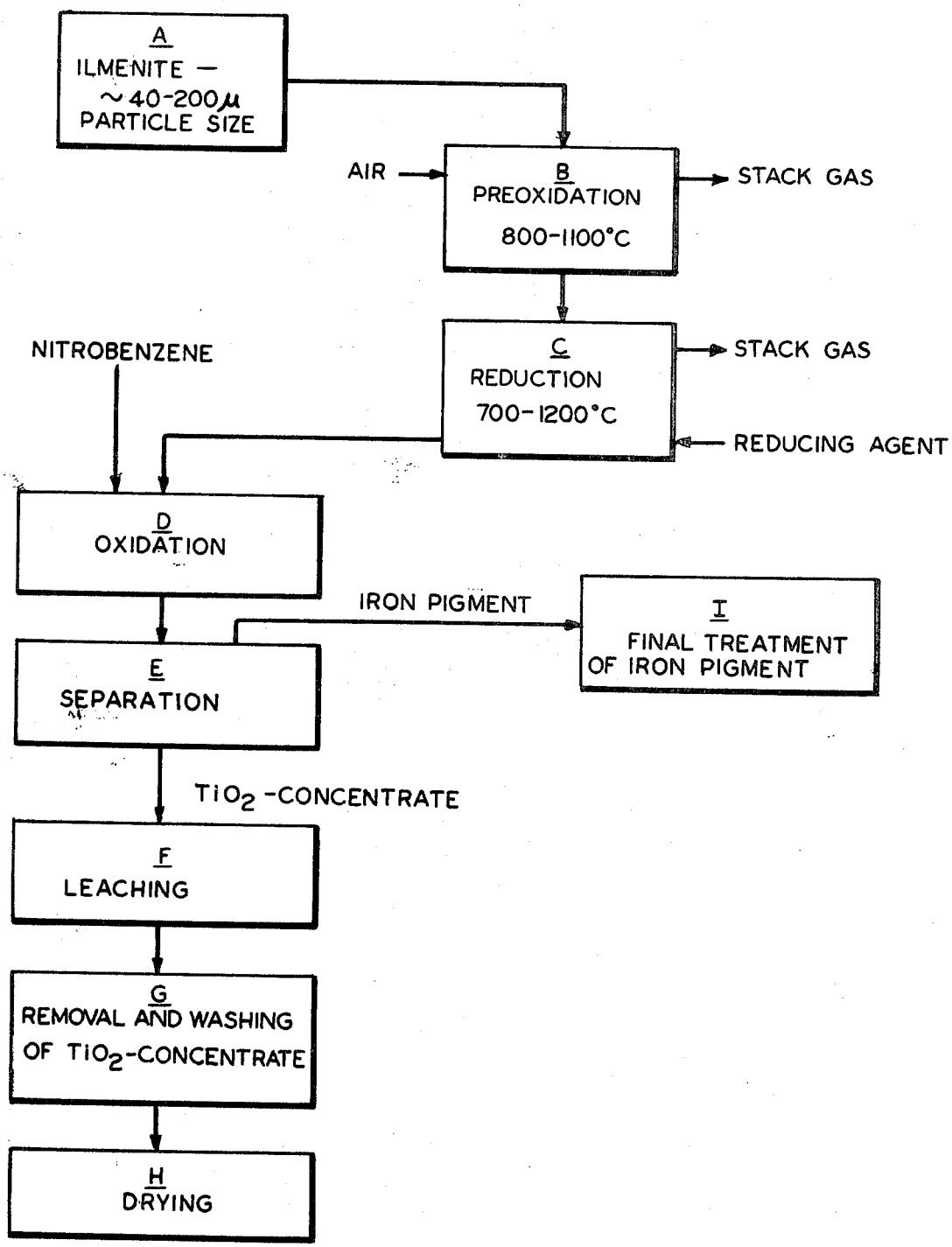

3,734,996
PREPARATION OF TITANIUM DIOXIDE CONCENTRATES AND IRON OXIDE PIGMENTS FROM ILMENITE
Heribert Bade, August Bellefontaine, and Gerhard Kienast, Krefeld, Germany, assignors to Farbenfabriken Bayer Aktiengesellschaft, Leverkusen, Germany
Filed Nov. 19, 1970, Ser. No. 90,918
Claims priority, application Germany, Dec. 2, 1969, P 19 60 379.3
Int. Cl. C01g 49/06
U.S. Cl. 423—83
8 Claims

ABSTRACT OF THE DISCLOSURE

Ilmenite, preferably after pre-oxidation, is reduced to convert iron oxide contained therein to iron, the ilmenite is treated with nitrobenzene at about 20 to 100° C. and a pH of 3 to 7 to oxidize the iron to iron oxide pigment which can be separated in relatively pure form from the titanium dioxide concentrate. The concentrate is then preferably leached with acid to remove residual iron impurities and leave a relatively pure titanium dioxide suited for chlorination.

Modifying agents present during the nitrobenzene oxidation will affect the color of the iron oxide pigment.

To facilitate clean separation of the iron oxide pigment from the titanium dioxide concentrate the reduced ilmenite should not contain an appreciable amount of particles with grain sizes of less than about 40 microns.

---

This invention relates to a process for the production of titanium dioxide concentrates from ilmenite.

Processes for the production of titanium dioxide concentrates containing 90% and more of $TiO_2$ from ilmenite are becoming increasingly important. These titanium dioxide concentrates are used instead of natural rutile, of which there are limited deposits, for the production of titanium tetracholoride. Titanium tetrachloride is the starting material for the production of titanium dioxide pigments by the so-called chloride process.

The direct chlorination of ilmenite is uneconomical because during chlorination the iron present in the ilmenite (in quantities of from 30 to 40%) is converted into chloride. The amount of chlorine set aside for the iron is lost or has to be recovered by complicated measures.

In one known process for working up ilmenite, the iron oxide component is initially converted as completely as possible into metallic iron by a reduction process. Hydrogen, carbon monoxide, mixtures of both gases or solid carbon are mainly used as the reducing agents. Reduction can be carried out in rotary tubular kilns or other suitable apparatus such as fluidized beds or combustion chambers. The reaction temperatures are in the range of from 700° C. to 1200° C. The original shape of the ilmenite grain remains intact although in addition to rutile finely divided metallic iron is now present in the grain. Accordingly, it is not possible magnetically to separate the iron from the non-magnetic titanium dioxide, with the result that the iron component has to be dissolved out in a subsequent process with dilute acids or salt solutions. A high-percentage titanium dioxide concentrate is obtained which is suitable for use as a starting material for the production of titanium tetrachloride, cf., for example, British patent specification No. 1,104,262. In this known process, however, the iron accumulates in a form in which it is almost impossible to use economically.

In the process disclosed in U.S. patent specification No. 3,252,787 the reduced ilmenite is treated with iron(III)-chloride solution, giving solid $TiO_2$-concentrate in addition to an iron(II)-chloride solution. The iron(II)-chloride solution is then treated with atmospheric oxygen to give iron(III)-chloride in addition to $Fe_2O_3$. The iron oxide accumulates in the form of $\beta$-FeOOH and because of its high chloride content cannot be used as a pigment.

British patent specification No. 980,869 discloses a process in which, after a reducing roasting, the ilmenite is treated in an aqueous, preferably acid, medium, as a result of which the iron is converted into iron oxide while air or other oxidizing gases are blown in. Yellow or black oxides can be obtained, depending on the conditions. However, considerable difficulties are involved in separating off the iron oxides from the $TiO_2$-concentrate. With the normal decantation process, the iron oxide contains up to 8% of $TiO_2$. It is also not possible with more sophisticated techniques of the kind known from the working up of ores considerably to reduce the titanium dioxide content of the iron oxide. According to Austral. Inst. Mining Metallurgy Proc. 214 (1965), page 42, it is unlikely ever to be possible to reduce the $TiO_2$ content to below 2%. However, iron oxides with a $TiO_2$ content such as this cannot be used as high-grade pigments.

It is also known that iron oxide pigments can be obtained by oxidizing iron and at the same reducing aromatic nitro compounds. The iron is reacted in a relatively coarse form (filings, wire tacks, etc.) in the presence of iron salts or even other metal salt solutions, to form the required oxide. The starting material must have an iron content of at least 90%. Black $Fe_3O_4$ is obtained in the presence of iron salts, whilst yellow FeOOH is obtained in the presence of aluminum salt solutions. Red iron oxide pigments can be obtained by adding a separately prepared seed or nucleus suspension as known per se. The properties of the iron oxides formed can also be controlled as already known by other additives such as, for example, sulfuric acid, phosphoric acid or an aniline salt. Processes of this kind are described for example in German patent specifications Nos. 463,773, 464,561 and 551,258.

It is accordingly an object of the present invention to provide a simple, effective and economic process for producing from ilmenite substantially iron-free titanium dioxide suited for chlorination, and substantially titanium-free iron oxide pigments.

This and other objects and advantages are realized in accordance with the present invention wherein a process for the production of titanium dioxide concentrates and iron oxide pigments from ilmenite is provided in which ilmenite is subjected to reducing roasting and in which the metallic iron formed, and the reduced ilmenite formed are reacted with nitrobenzene at a temperature of from about 20° C. to 100° C. and at a pH value of from about 3 to 7, optionally in the presence of hydrolyzable metal salts or other modifying compounds, to form iron oxide which is separated from the titanium dioxide.

Surprisingly, the nitrobenzene reduction process gives an iron oxide pigment which can readily be separated off from the titanium dioxide residue. Not only is a highly concentrated titanium dioxide with a high $TiO_2$ content of around 90% obtained, but an iron oxide whose $TiO_2$ content is well below 1% is also obtained. Separation does not involve any complicated operations. It is possible to use the conventional grading apparatus such as for example screen graders and hydrocyclones, optionally in conjunction with overflow thickeners. Surprisingly, it is possible to obtain iron oxides with pigment properties which could not be obtained by the conventional nitrobenzene process. The black pigments are up to 80% superior in their tinting strength to the products made with iron filings by the conventional nitrobenzene reduction process. For the same tinting strength, the hue is tinged with much more blue than in conventional types. The yellow pigments are distinctly purer and are tinged with more green both in their full color and also in admixture with titanium dioxide than the corresponding products made with iron filings with the aid of nitrobenzene. In some cases, it is even possible to obtain yellow pigments whose properties correspond substantially to those of the pigment produced by the Penniman process.

In the production of red pigments via a seed suspension, long reaction times and an incomplete reaction are involved where the usual iron filings or pins are used. By contrast, it is possible to obtain a complete reaction over a short period by using the reduced ilmenite.

The titanium dioxide concentrate separated off can be directly subjected to chlorination, although it is best treated with acids beforehand. In this way, it is possible to obtain concentrates containing 95% of $TiO_2$. After-treatment is carried out with the usual inorganic acids such as for example hydrochloric acid or sulfuric acid with concentrations of from about 5 to 20% by weight in the case of hydrochloric acid and from about 5 to 40% by weight in the case of sulfuric acid. It is best to use the approximately 20% so-called thin acid accumulating during the sulfate process for leaching and to carry out this process in several stages.

If the titanium dioxide concentrate and the iron oxide pigment are to be cleanly separated from one another after the reaction with nitrobenzene, the reduced ilmenite used should not obtain any appreciable fractions with grain sizes of less than about 40 microns.

More particularly, the process according to the invention is carried out as follows:

The ilmenite to be reduced with particle sizes of from about 40 to 200 microns is preferably initially subjected to an oxidation because a pre-oxidized ilmenite is easier to reduce. The oxidizing pretreatment is carried out at temperatures of from about 800 to 1100° C. in conventional apparatus such as for example rotary tubular kilns or fluidizing furnaces. The preoxidized ilmenite is then reduced, again in rotary kilns, shaft furnaces or fluidizing furnaces, under the effect of reducing agents at temperatures of from about 700 to 1200° C. Preferred reducing agents include hydrogen, carbon monoxide or mixtures of both gases, or even natural gas, although it is also possible to use solid carbon-containing materials such as for example coal dust. After cooling, the reduced ilmenite is transferred to vessels equipped with stirrers, in which the metallic iron is oxidized into iron oxide pigment following the addition of nitrobenzene and optionally the other conventional modifying compounds. On completion of oxidation, most of the crude aniline is decanted off from the paste-like reaction medium, and the residual aniline is separated off by distillation with steam. The aqueous suspension is then delivered to the separation stage for which it is possible to use any separation equipment by which fine-grained solids can be separated from one another through differences in specific gravity and grain size. As already mentioned, it is possible to use screen graders, overflow thickeners, hydrocyclones and other decanters, optionally in conjunction with one another. The titanium dioxide concentrate separated off is then preferably delivered to a leaching stage in which the titanium dioxide is treated with dilute inorganic acids, preferably in several stages. Most of the iron oxide still present is separated off during this after treatment so that concentrates with a $TiO_2$-content of 95% are obtained in this way. Leaching is carried out in known manner in stirrer tanks or countercurrent apparatus. After leaching, the solid residue is washed and dried and can then be subjected to chlorination. The iron oxide pigment separated off is also washed and dried and optionally fine-ground.

A preferred performance of the process according to the invention is illustrated purely diagrammatically in the accompanying flow sheet in which the letters have the following meaning:

A=ilmenite storage container
B=preoxidation
C=reduction stage
D=nitrobenzene reduction
E=separating iron oxide pigment from titanium dioxide concentrate
F=leaching the $TiO_2$ concentrate with dilute acids
G=filtering and washing the $TiO_2$ concentrate
H=drying the concentrate
I=final treatment of iron oxide, pigment such as washing, drying, calcining and, optionally, grinding the iron oxide pigment.

The nitrobenzene reduction is carried out in known manner, the properties of the pigment being influenced by establishing special conditions.

More particularly, the nitrobenzene reduction can be carried out as follows:

$FeCl_2$, $AlCl_3$ and aniline salt solution are initially vigorously stirred either separately or together in different quantities and ratios with some of the reduced ilmenite to be treated and with some of the nitrobenzene to be used. The mixture very quickly reaches 100° C. under the effect of the heat generated during the reaction. At this point, further quantities of reduced ilmenite and nitrobenzene are introduced and the mixture is kept at boiling temperature by the heat of reaction until the required iron oxide has been formed.

The different yellow and black nuances of the iron oxide are obtained partly by the addition of relatively large quantities of $FeCl_2$, $AlCl_3$ and aniline salt solution and partly by the addition of relatively small quantities of $H_2SO_4$ and/or $H_3PO_4$.

The process according to the invention is illustrated by the following examples:

Example 1a.—Partially reduced ilmenite 1000 g. of ilmenite containing 50.0% of $TiO_2$, 37.7% of FeO and 9.1% of $Fe_2O_3$ with grain sizes of from 60 to 200 microns were initially oxidized with air for 1.5 hours at 800° C. in a fluidized bed. The subsequent reduction stage was also carried out at 800° C. with hydrogen over a period of 5 hours. The reduced ilmenite contained 40.5% of metallic iron.

Example 1b.—Black pigment 20 ml. of a 36.7% $FeCl_2$-solution (d.=1.300), 20 ml. of of water, 20 ml. of nitrobenzene and 200 g. of the partially reduced ilmenite containing 40.5% (81 g.) of Fe metal and 56.2% of $TiO_3$ are added to 90 ml. of a 43% aniline hydrochloride solution (d.=1.085). After this mixture has been heated while stirring to 90° C., 105 ml. of nitrobenzene and 170 g. of the partially reduced ilmenite containing 40.5% (69 g.) of Fe metal are simultaneously run in over periods of 2 hours and 1 hour, respectively.

On completion of the nitrobenzene reduction, most of the aniline formed is decanted off and the residue left in the reaction mixture is distilled off with steam.

The $Fe_3O_4$ formed by oxidation of the ilmenite iron is separated from the $TiO_2$-concentrate by washing out, washed free from salts, filtered and dried at 100 to 110° C. An iron oxide black pigment of high covering power coupled with a high resistance to light and alkalis is obtained in this way. It has a particle size of from 0.5 to 0.6 micron and an $Fe_2O_3$-content of from 93 to 94%. Yield: more than 90%.

The ilmenite residue contained 91.1% of $TiO_2$. After three leachings with hot 20% HCl (ratio by weight of concentrate to acid=1:1.2), a concentrate containing 94.1% of $TiO_2$ was obtained.

Example 1c

In a rerun of Example 1b, the acid leaching was carried out with a waste acid, containing 20% of $H_2SO_4$, from the TiO₂ sulfate process (100 g. of residue to 100 ml. of acid) over a period of 2 hours at 100° C. The moist residue was then heated once again with fresh acid for a period of 2 hours. The filtered and dried concentrate contained 95.2% of TiO₂.

Example 2.—Yellow pigment 60 ml. of water, 25 ml. of nitrobenzene and 63 g. of the partially reduced ilmenite according to Example 1a, containing 40.5% (25 g.) of Fe metal are added to 80 ml. of 17.5% AlCl₃ solution (d.=1.205).

After this mixture has been heated with stirring to 90° C., 142 ml. of nitrobenzene and 407 g. of the partially reduced ilmenite containing 40.5% (165 g.) of Fe metal are run in simultaneously over periods of 2 hours and 3 hours, respectively. In addition, approximately 300 to 400 ml. of water are gradually run in after the reaction mixture has assumed a certain consistency, in order to obtain the required consistency.

On completion of the nitrobenzene reduction, most of the aniline formed is decanted off and the residue left in the reaction mixture is distilled off with steam.

The FeO(OH) formed by oxidation of the ilmenite iron is washed out of the TiO₂ concentrate by washing, subjected to further washing to free it from salts, filtered and dried at a temperature below 200° C. An iron oxide yellow pigment of high covering power coupled with a high resistance to light and alkalis is obtained in this way. Its particle size is in the range of from 0.7 to 1.0 micron (length) and 0.2 micron wide, and its Fe₂O₃ content is in the range of from 86% to 88%. Oil number: 37, yield: more than 90%.

The residue freed from the finely divided pigment contained 86.1% of TiO₂. Following the procedure described in Example 1b a concentrate containing 94.4% of TiO₂ was obtained with 20% HCl, whilst a concentrate containing 93.1% of TiO₂ was obtained with waste acid from the TiO₂-sulfate process which contained approximately 20% of free H₂SO₄.

Example 3.—Red pigment 65 g. of reduced ilmenite, 416 ml. of FeSO₄ (20%) and 100 ml. of nitrobenzene are adjusted to pH 8.6 with 210 ml. of 19% NaOH. 162 ml. of nitrobenzene and 790 g. of partially reduced ilmenite are run into this seed solution at 100° C. over periods of 1 hour and 4 hours, respectively. The reaction is complete after 5 hours. A red pigment is obtained from the reaction mixture which may be further worked up as in Examples 1 and 2.

It will be appreciated that the instant specification and examples are set forth by way of illustration and not limitation, and that various modifications and changes may be made without departing from the spirit and scope of the present invention.

What is claimed is:

1. In the process for production of TiO₂ concentrates and F₂O₃ pigments in which ilmenite of at least 40 micron size is reduced to convert iron oxide to iron, the improvement comprising, treating the reduced ilmenite with aqueous nitrobenzene at a pH of 3–7 and a temperature of 20°–100° C. whereby the iron is oxidized to an iron oxide having a particle size substantially smaller than the reduced ore, and separating the fine pigment sized iron oxide particle from the ore residue now enriched in titanium dioxide by solid-solid separation.

2. A process according to claim 1, wherein the oxidation is effected in the presence of an agent to modify the color of the iron oxide pigment produced.

3. A process according to claim 2, wherein the agent is an iron salt and the iron oxide pigment produced is black.

4. A process according to claim 2, wherein the agent is an aluminum salt and the iron oxide pigment produced is yellow.

5. A process according to claim 1, wherein the titanium dioxide enriched ore residue is treated with acid to dissolve away impurities.

6. A process according to claim 5, wherein said acid is the waste sulfuric acid of approximately 20% concentration accumulating during a TiO₂-sulfate process.

7. A process according to claim 1, wherein the reduced ilmenite does not contain an appreciable amount of particles having grain sizes of less than about 40 microns.

8. A process according to claim 7, wherein the oxidation is effected in the presence of an agent to modify the color of the iron oxide pigment produced, and wherein the titanium dioxide enriched ore residue is treated with acid to dissolve away impurities.

References Cited

UNITED STATES PATENTS

| | | | |
|---|---|---|---|
| 2,339,808 | 1/1944 | Raynestad et al. | 23—200 |
| 1,489,417 | 4/1924 | Bachman | 23—117 X |
| 1,857,557 | 5/1932 | Laux | 23—200 |
| 3,257,198 | 6/1966 | Volk et al. | 75—1 |
| Re. 24,173 | 7/1956 | Marsh | 23—200 |
| 3,446,590 | 5/1969 | Michal | 23—202 |
| 1,840,326 | 1/1932 | Ott et al. | 23—200 |
| 1,998,540 | 4/1935 | Haberland | 23—200 X |
| 2,731,327 | 1/1956 | Anderson | 23—202 |

FOREIGN PATENTS

| | | | |
|---|---|---|---|
| 1,803,637 | 5/1970 | Germany | 106—304 |

GEORGE O. PETERS, Primary Examiner

U.S. Cl. X.R.

423—140, 160; 106—304